(12) United States Patent
Woodall et al.

(10) Patent No.: US 6,329,725 B1
(45) Date of Patent: Dec. 11, 2001

(54) SYSTEMS AND METHODS FOR UTILIZING EXCESS ELECTRIC POWER FROM A MARINE TRANSPORTATION VESSEL

(75) Inventors: Robert M. Woodall; Philip J. Grossweiler, both of The Woodlands, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 09/499,986

(22) Filed: Feb. 8, 2000

Related U.S. Application Data

(60) Provisional application No. 60/120,095, filed on Feb. 16, 1999.

(51) Int. Cl.[7] ................................ H02J 1/10; H02J 3/06
(52) U.S. Cl. ............................................................ 307/19
(58) Field of Search .................................. 307/18, 19, 43, 307/44, 52, 64, 65

(56) References Cited

U.S. PATENT DOCUMENTS

| | | |
|---|---|---|
| 3,669,288 | 6/1972 | Young ................................... 214/152 |
| 5,065,581 | 11/1991 | Jenkins . |
| 5,804,953 | 9/1998 | Bowyer et al. . |

FOREIGN PATENT DOCUMENTS

3246419 A1    6/1984   (DE) .

OTHER PUBLICATIONS

Jerry P. Davis and Sander E. Nydick, "US chemical plant chooses slow speed diesel congeneration system", published in *Modern Power Systems*, Dec. 1981, pp. 57–62.

*Primary Examiner*—Edward H. Tso
(74) *Attorney, Agent, or Firm*—Marcy Hoefling

(57) ABSTRACT

Systems and methods are provided for delivering excess electric power to an electric power grid from a marine transportation vessel while said marine transportation vessel is at port.

8 Claims, 2 Drawing Sheets

SYSTEMS AND METHODS FOR UTILIZING EXCESS ELECTRIC POWER FROM A MARINE TRANSPORTATION VESSEL

This application claims the benefit of U.S. Provisional Application No. 60/120,095, filed Feb. 16, 1999.

FIELD OF THE INVENTION

The present invention relates to utilization of excess electric power from a marine transportation vessel while the vessel is at port and to systems and methods for delivering the excess electric power to an electric power grid. More particularly, this invention relates to systems and methods for delivering excess electric power from a fluid fuel marine transportation vessel to an electric power grid while the vessel is at port delivering its cargo to market.

BACKGROUND OF THE INVENTION

Various terms are defined in the following specification. For convenience, a Glossary of terms is provided herein, immediately preceding the claims.

Many sources of natural gas are located in remote areas, great distances from any commercial markets for the gas. Sometimes a pipeline is available for transporting produced natural gas to a commercial market. When pipeline transportation to a commercial market is not feasible, produced natural gas is often processed into conventional liquefied natural gas (LNG), at temperatures of about −162° C. (−260° F.) and at atmospheric pressure, for transport to market. The LNG is typically transported via specially built tanker ships, and then stored and revaporized at an import terminal near the market.

In addition to LNG transportation technology, United States Patent application Ser. No. 09/099268 (the "PLNG Container Patent Application"), having International Patent Application Number PCT/US98/12726 and International Publication Number WO 98/59085 and entitled "Improved System for Processing, Storing, and Transporting Liquefied Natural Gas", describes containers and transportation vessels for storage and marine transportation of pressurized liquefied natural gas (PLNG) at a pressure in the broad range of about 1035 kPa (150 psia) to about 7590 kPa (1100 psia) and at a temperature in the broad range of about −123° C. (−190° F.) to about −62° C. (−80° F.). The PLNG Container Patent Application is hereby incorporated herein by reference. As used throughout the remainder of this application, the term "PLNG Holder" is meant to refer to any container suitable for storing and transporting PLNG, including without limitation a container as described in the PLNG Container Patent Application.

Transportation vessels or ships for transporting a fluid fuel, including without limitation LNG, PLNG, liquefied petroleum gas (LPG), or compressed natural gas (CNG), may utilize electric motor driven propellers powered by electricity from a generator driven by a diesel engine, a gas turbine, or a steam turbine. Hereinafter, any reference to a generator includes any equipment capable of generating electric power. As an example, a generator on a fluid fuel transportation vessel with electric drive propellers may have the capability to generate about 50 mega-watts (MW) of power. Typically, over 90% of this power is used to propel the transportation vessel during transit between export and import terminals. While at an import terminal during unloading operations, i.e., during delivery of fluid fuel to market, about 20% of installed electrical power capacity may be required to deliver power for cargo handling (i.e., fluid fuel containment, loading, and delivery), for the transportation vessel's utilities, and for supplying electricity needed for on-board personnel, e.g., for lighting, small appliances, and etceteras. The remaining 80% of the installed electrical power capacity is idle. Since a significant investment is required to install the required generators on the vessel, a need exists to utilize the vessel's investment that is otherwise idle during loading and unloading operations.

Additionally, other marine transportation vessels, including without limitation cargo ships and cruise ships, sometimes carry on-board generators for powering electric drive propellers. Similar to the fluid fuel transportation vessels, while such other marine transportation vessels are at port, much of the installed electrical power capacity is idle. Since a significant investment is required to install the required generators on the marine transportation vessels, a need exists to utilize the investment that is otherwise idle while such marine transportation vessels are at port.

In certain instances when a marine vessel for transporting conventional LNG is at port, it is known to shut down the generator, e.g., for repair, and transfer electric power to the vessel from an outside source. Additionally, power generation plants are sometimes located on floating barges. However, to our knowledge, currently no system or method is known for delivering excess electric power from a self propelled marine transportation vessel to an electric power grid.

Therefore, an object of this invention is to provide systems and methods suitable for utilizing the excess electric power available on a marine transportation vessel while such vessel is at port. A specific object of this invention is to provide systems and methods suitable for delivering the excess electric power available on a fluid fuel transportation vessel to an electric power grid during unloading operations, i.e., during delivery of fluid fuel to market. Another specific object is to provide systems and methods suitable for delivering the excess electric power available on a fluid fuel transportation vessel to an electric power grid during loading operations. Further objects are made apparent by the following description of the invention.

SUMMARY OF THE INVENTION

Consistent with the above-stated objects of the present invention, systems and methods are provided for delivering excess electric power from a marine transportation vessel at port to an electric power grid. As used throughout this specification, reference to a marine transportation vessel as being "at port", includes any time during which excess electric power is available from the marine transportation vessel, particularly when the marine transportation vessel is docked or moored at either an export terminal or import terminal, including without limitation terminals at offshore locations. Additionally, reference to "excess electric power" includes any electric power that is available on a marine transportation vessel, but which under the then-existing operating mode of the marine transportation vessel would otherwise not be used, and can include anywhere from greater than zero percent of the available electric power up to and including one hundred percent of the available electric power. A typical marine transportation vessel has excess electric power up to and approaching one hundred percent of the available electric power. As used herein, "electric power grid" includes any system adapted for receiving and either utilizing or distributing electric power.

DESCRIPTION OF THE DRAWINGS

The advantages of the present invention will be better understood by referring to the following detailed description and the attached drawings in which.

Figure 1A:
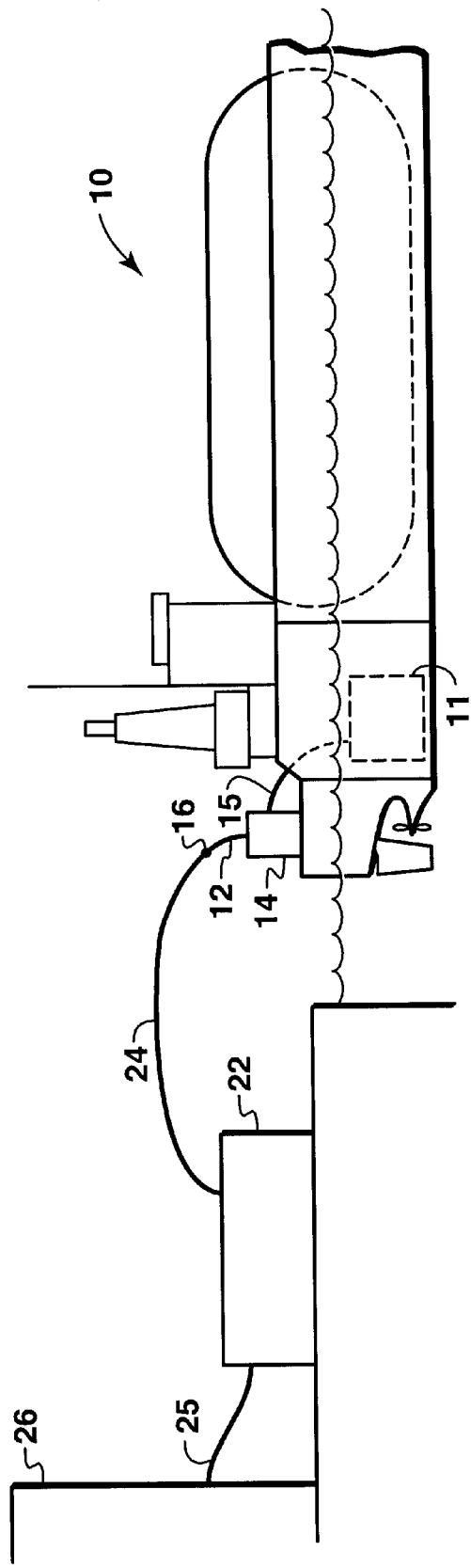
FIG. 1A schematically illustrates one embodiment of a system according to the present invention for deliverin excess electric power from a marine transportation vessel at port to an electric power grid.

While the invention will be described in connection with its preferred embodiments, it will be understood that the invention is not limited thereto. On the contrary, the invention is i n tended to cover all alternatives, modifications, and equivalents which may be included within the spirit and scope of the invention, as defined by the appended claims. More particularly, although the remainder of this application focuses on delivery of electric power from PLNG transportation vessels, this invention is not limited thereto.

DETAILED DESCRIPTION OF THE INVENTION

PLNG Transportation Vessels

PLNG transportation vessels are preferably marine vessels, e.g., ships, which are propelled across a body of water between one or more PLNG export terminals and one or more PLNG import terminals, loading and unloading PLNG. Such PLNG transportation vessels preferably have at least one PLNG Holder.

The PLNG transportation vessel design preferably offers flexibility in alternatives to meet customers' needs and minimize costs, as more fully described below in the discussion of export and import terminals. The transportation vessel can be designed for a specific capacity by adding or deleting PLNG Holders. It can be designed to load/unload PLNG in a short period of time (typically 12 to 24 hours) or load/unload at slower rates, such as plant production rates. If a PLNG recipient desires to reduce its import costs to a minimum, the PLNG transportation vessel can be designed to include on-board vaporization equipment to deliver gas directly to the recipient.

PLNG Export and Import Terminals

The PLNG export terminal can include, without limitation, a dock, one or more PLNG Holders, and one or more shipping pumps. The PLNG import terminal can include, without limitation, a dock, one or more PLNG Holders, one or more shipping pumps, and vaporizing equipment.

Alternatively, PLNG Holders can be eliminated at the PLNG export terminal and/or PLNG import terminal. In a PLNG system with no PLNG Holders at the export terminal, produced PLNG is transferred directly from the PLNG plant to transportation PLNG Holders on board a PLNG transportation vessel. In a PLNG system with no PLNG Holders at the import terminal, the import terminal consists essentially of vaporization equipment or, alternatively, each transportation vessel in the PLNG fleet has standard vaporization equipment on board to directly convert the PLNG to pipeline quality gas. For the case where neither the PLNG export terminal nor the PLNG import terminal have PLNG Holders, for example, two PLNG transportation vessels are added to the fleet of PLNG transportation vessels over the number that would typically be required to transport and deliver the PLNG to market using export and import terminals. Thus, while the other PLNG transportation vessels are in transit, one of the additional PLNG transportation vessels is moored at the export terminal, either having its PLNG Holder(s) filled with, or storing, the PLNG, and the other additional PLNG transportation vessel is moored at the import terminal delivering PLNG from its PLNG Holder(s) directly to market. In the case of vaporizers on the transportation vessels, such mooring can be offshore, such as a single anchor leg mooring (SALM). These alternatives are economically advantageous over conventional LNG systems and can substantially reduce the cost of export and import terminals.

Delivering Electric Power to Electric Power Grid from Transportation Vessel

In accordance with the present invention, the available electric power of a PLNG transportation vessel is utilized while the vessel is at port, providing for the simultaneous sale of natural gas and electric power from the vessel. As stated in the background section of this specification and without hereby limiting this invention, power needed for operation of the vessel can be provided by electricity from a generator driven by a diesel engine, a gas turbine, or a steam turbine. In addition to natural gas and other fuel sources, fuel oil may also be used to generate electricity. While at a PLNG import terminal, about 20% of installed, electrical power capacity is generally required to deliver power for cargo handling, for the transportation vessel's utilities, and for supplying electricity for use by on-board personnel, e.g., for lighting, small appliances, and etceteras. This invention provides systems and methods whereby, during unloading operations of a vessel that is delivering gas directly to market, the vessel simultaneously delivers electric power directly to a local electric power grid. Since generators are installed on the vessel by necessity, this option effectively utilizes the vessel's investment that would otherwise be idle during unloading operations. Additionally, when the PLNG cargo, e.g., generally its boil-off gas, is used to generate the electricity, the time the transportation vessel is in port discharging cargo is reduced, as will be further described below.

Referring now to FIG. 1A, a system according to this invention for delivering electric power from a marine transportation vessel 10 comprises: (i) at least one generator 11 connected to electrical distribution switchgear 14 via standard connection equipment 15, (ii) at least one ship-side power cable 12 connected to electrical distribution switchgear 14 and to at least one ship-side connection 16, such as a quick connect/disconnect connection, and (iii) onshore equipment 22 for delivering power into at least one onshore electric power grid 26 via standard connection equipment 25, said onshore equipment 22 including at least one shore-side power cable 24 connected to said at least one ship-side connection 16 thus completing a circuit from the at least one generator 11 to the at least one electric power grid 26, and also including other equipment (not illustrated on FIG. 1A), for example without thereby limiting this invention, metering equipment, switchgear equipment, and transformer equipment. In one embodiment, onshore equipment 22 is permanently installed. In one embodiment, onshore equipment 22 comprises electrical controls (not illustrated on FIG. 1A) to manage load during unloading of natural gas and distribution of surplus electric power from transportation vessel 10 into at least one onshore electric power grid 26. An alternative embodiment comprises additional generators 11 on transportation vessel 10, beyond those that arc needed to power transportation vessel 10 while in transit, in order to deliver a greater amount of energy in the form of electric power to market, e.g. to at least one onshore electric power grid 26. Again, when the PLNG cargo on board transportation vessel 10 is used to generate the electric power delivered via a system according to the present invention to at least one onshore electric power grid 26, there will be a coirresponding decrease in gas deliveries. Taken to the extreme, a PLNG transportation vessel 10 could deliver only electricity, i.e., no natural gas, to market. In such an instance, the time at port would likely increase significantly.

For this invention, the preferred system and operating configuration depends upon relative demands for electricity and gas. The lowest cost transportation vessel 10 option is to utilize only the surplus capacity of at least one generator 11. This option is particularly useful in conjunction with delivery of PLNG directly from transportation vessel 10 without going through terminal storage, as described above, i.e., when the PLNG is vaporized either on board transportation vessel 10 or with vaporizers at an onshore or offshore terminal. This option generally requires transportation vessel 10 to be at port for a longer period of time than is required for unloading of PLNG into terminal storage. For purposes of example only, without thereby limiting this invention, the delivery of vaporized PLNG may require transportation vessel 10 to be at port from 3 to 6 days, whereas the unloading of PLNG into terminal storage may require transportation vessel 10 to be at port only for about 12 to 24 hours.

EXAMPLE

In an example application of the aforementioned option, without thereby limiting this invention, a PLNG transportation vessel with diesel electric drive has the capability to produce about 60 MW of electric power. Approximately 90% of this power is used to propel the transportation vessel during transit between export and import terminals. While at an import terminal, only about 8 MW of power is required to deliver power for cargo handling, transportation vessel's utilities, and supplying electricity needed for on-board personnel, e.g., for lighting, small appliances, and etceteras. During unloading operations of the PLNG transportation vessel, which is delivering gas directly to market, the transportation vessel is at port for 3 to 6 days. The transportation vessel's power system is connected to the local electric power grid while the transportation vessel is at port and about 52 MW of power is delivered directly from the transportation vessel to the local electric power grid. Since diesel drive generators are already installed on the transportation vessel, this sale of electricity effectively utilizes the transportation vessel's investment that would otherwise be idle during unloading operations—and, if boiloff gas is used as fuel, reduces the time the transportation vessel is in port discharging cargo.

Figure 1B:
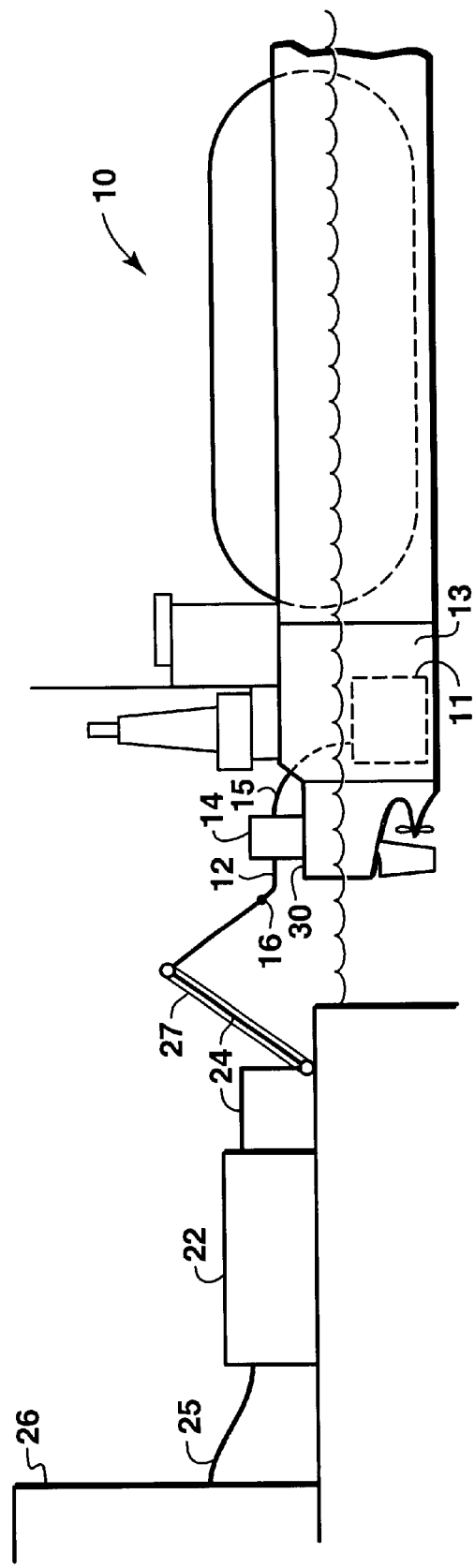
FIG. 1B schematically illustrates one embodiment of a system according to the present invention for delivering excess electric power from a PLNG transportation vessel at port to an electric power grid.

In this example, referring now to FIG. 1B, the system of this invention for delivering power from PLNG transportation vessel 10 to electric power grid 26 comprises (i) at least one diesel drive generator 11, located in the engine room 13 of transportation vessel 10, and connected to electrical distribution switchgear 14 via standard connection equipment 15 (ii) a ship-side power cable 12 from electrical distribution switchgear 14, located on the main deck 30 outside the engine room 13 of the transportation vessel 10, to a quick connect/disconnect ship-side connection 16, and (iii) onshore equipment 22 comprising metering equipment, switchgear equipment, and transformer equipment to deliver power into onshore electric power grid 26 via standard connection equipment 25, and further comprising shore-side power cable 24, supported by connector arm 27, and connected from onshore equipment 22 to quick connect/disconnect ship-side connection 16 thus completing a circuit from the at least one diesel drive generator 11 to the electric power grid 26. In addition, electrical controls (not illustrated on FIG. 1B) to manage load sharing between transportation vessel 10 loads and distribution into the onshore electric power grid 26 are included in onshore equipment 22. The load management controls have the ability to direct delivery of power to any appropriate market or customer within the scope of onshore electric power grid 26. Locations of specific pieces of equipment in FIG. 1B are for purposes of illustration, and arc not intended to limit this invention. For example, although FIG. 1B illustrates electrical distribution switchgear 14 on the main deck 30 outside engine room 13, electrical distribution switchgear 14 may be located elsewhere on transportation vessel 10, e.g., in engine room 13.

The systems and methods of this invention for delivering excess electric power from a marine transportation vessel are not limited to delivery of electric power from a PLNG transportation vessel. The systems and methods may be used to facilitate delivery of electric power from marine transportation vessels delivering conventional LNG, LPG, CNG, or other similar fluid fuels. The systems and methods of this invention may also be used to facilitate delivery of electric power from other marine transportation vessels, including without limitation cargo ships and cruise ships. Similarly, although use of the system of the present invention is described in connection with delivery to an onshore electric power grid, the invention is not limited thereto. For example, without thereby limiting this invention, excess electric power from a marine transportation vessel can also be used (i) during PLNG loading operation, or (ii) to drive process equipment in a PLNG liquefaction plant or other process plants. In addition, the electricity could be sold into a power grid near a PLNG plant. The recipient of electric power from the transportation vessel may be located at sea if desired. Additionally, a PLNG transportation vessel may be part of a land-based transportation or distribution system for PLNG or a similar fluid fuel.

While the foregoing invention has been described in terms of one or more preferred embodiments, it should be understood that other modifications may be made without departing from the scope of the invention, which is set forth in the following claims.

GLOSSARY OF TERMS at port: includes any time during which excess electric power is available from a marine transportation vessel, particularly when the marine transportation vessel is docked or moored at either an export terminal or import terminal, including without limitation terminals at offshore locations;
cargo handling: fluid fuel containment, loading, and delivery;
CNG: compressed natural gas;
electric power grid: includes any system adapted for receiving and either utilizing or distributing electric power;
excess electric power: includes any electric power that is available on a marine transportation vessel, but under the then-existing operating mode of the marine transportation vessel would otherwise not be used, and can include anywhere from greater than zero percent of the available electric power up to and including one hundred percent of the available electric power;
generator: includes any equipment capable of generating electric power;
kPa: thousands of Pascals;
LNG: liquefied natural gas;
LPG: liquefied petroleum gas;
MCFD: million cubic feet per day;
MW: mega-watts (millions of watts);

PLNG: pressurized liquefied natural gas;

PLNG Holder: any container suitable for storing and transporting PLNG, including without limitation a PLNG container as described in the PLNG Container Patent Application;

psia: pounds per square inch absolute;

SALM: single anchor leg mooring; and unloading operations: delivery of fluid fuel to market.

What we claim is:

1. A system comprising:
   (a) electrical distribution switchgear on board a marine transportation vessel and connected to at least one generator on board said marine transportation vessel;
   (b) at least one ship-side power cable connected to said electrical distribution switchgear; and
   (c) equipment connected to at least one electric power grid and adapted for delivering power into said at least one electric power grid, wherein a shore-side power cable is connected to said equipment and to said ship-side power cable, thus, completing a circuit from said at least one generator to said at least one electric power grid to facilitate delivery of excess electric power from said at least one generator to said at least one electric power grid while said marine transportation vessel is at port.

2. A system comprising:
   (a) electrical distribution switchgear on board a marine transportation vessel for transporting a fluid fuel and connected to at least one generator on board said marine transportation vessel;
   (b) at least one ship-side power cable connected to said electrical distribution switchgear; and
   (c) equipment connected to at least one electric power grid and adapted for delivering power into said at least one electric power grid, wherein a shore-side power cable is connected to said equipment and to said ship-side power cable, thus, completing a circuit from said at least one generator to said at least one electric power grid to facilitate delivery of excess electric power from said at least one generator to said at least one electric power grid while said marine transportation vessel is at port.

3. The system of claim 2 wherein said fluid fuel is liquefied natural gas.

4. The system of claim 2 wherein said fluid fuel is pressurized liquefied natural gas.

5. A method comprising the steps:
   (a) connecting electrical distribution switchgear on board a marine transportation vessel to at least one generator on board said marine transportation vessel, wherein said electrical distribution switchgear has at least one ship-side power cable connected thereto;
   (b) connecting equipment to at least one electric power grid, wherein said equipment is adapted for delivering power into said at least one electric power grid and includes at least one shore-side power cable;
   (c) connecting said shore-side power cable to said ship-side power cable, thus completing a circuit from said at least one generator to said at least one electric power grid; and
   (d) delivering excess electric power from said vessel to said electric power grid via said circuit.

6. A method comprising the steps:
   (a) connecting electrical distribution switchgear on board a marine transportation vessel to at least one generator on board said marine transportation vessel, wherein said electrical distribution switchgear has at least one ship-side power cable connected thereto and said marine transportation vessel is adapted for transporting a fluid fuel;
   (b) connecting equipment to at least one electric power grid, wherein said equipment is adapted for delivering power into said at least one electric power grid and includes at least one shore-side power cable;
   (c) connecting said shore-side power cable to said ship-side power cable, thus completing a circuit from said at least one generator to said at least one electric power grid; and
   (d) delivering excess electric power from said vessel to said electric power grid via said circuit.

7. The method of claim 6 wherein said fluid fuel is liquefied natural gas.

8. The method of claim 6 wherein said fluid fuel is pressurized liquefied natural gas.

* * * * *